(12) United States Patent
Yoshida et al.

(10) Patent No.: US 6,263,325 B1
(45) Date of Patent: Jul. 17, 2001

(54) SYSTEM, METHOD, AND PROGRAM STORAGE MEDIUM FOR EXECUTING A LEARNING ALGORITHM

(75) Inventors: Yukiko Yoshida; Nobue Adachi, both of Kanagawa (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 09/161,984

(22) Filed: Sep. 29, 1998

(30) Foreign Application Priority Data

Feb. 27, 1998 (JP) .................................................. 10-046626

(51) Int. Cl.$^7$ ..................................................... G06F 15/18
(52) U.S. Cl. .................................. 706/12; 706/13; 706/25
(58) Field of Search ................................. 706/12, 13, 14, 706/16, 25

(56) References Cited

U.S. PATENT DOCUMENTS

| | | | | |
|---|---|---|---|---|
| 4,599,692 | * | 7/1986 | Tan et al. ................................ | 706/12 |
| 4,620,286 | * | 10/1986 | Smith et al. ........................... | 706/12 |
| 5,463,718 | * | 10/1995 | Maeda et al. .......................... | 706/12 |
| 5,568,590 | * | 10/1996 | Tolson ................................... | 706/13 |
| 5,579,440 | * | 11/1996 | Brown ................................... | 706/14 |
| 5,819,247 | * | 10/1998 | Freund et al. ......................... | 706/25 |
| 5,848,403 | * | 12/1998 | Gabriner et al. ...................... | 706/13 |
| 5,930,780 | * | 7/1999 | Hughes et al. ........................ | 706/13 |
| 5,970,482 | * | 10/1999 | Pham et al. ........................... | 706/16 |
| 6,004,015 | * | 12/1999 | Watanabe et al. .................... | 700/28 |
| 6,029,099 | * | 2/2000 | Brown ................................... | 700/245 |
| 6,064,996 | * | 5/2000 | Yamaguchi et al. .................. | 706/13 |

FOREIGN PATENT DOCUMENTS 9-305565    11/1997 (JP) ................................ G06F/15/18

OTHER PUBLICATIONS

Montebello, "Wrapping WWW information sources", IEEE pp 431–436, 2000.*
Xie et al, "The multi parameter combination mind evolutionary based machine learning", IEEE, pp 183–187, 2000.*
Liu et al, "An extended genetic rule induction algorithm" IEEE pp 458–463, 2000.*
H. Chen et al., "Intelligent Spider for Internet Searching," Proceedings of the Thirtieth Hawaii International Conference on Systems Sciences, 1997, vol. 4, pp. 178–188, Jan. 1997.*
Y. Ishida, et al., "Active Noise Control . . . an Evolution"; *IEEE*, 1996, pp. 150–153.
Y. Yoshida, et al, "A GA Visualisation Tool", *1997 Real World Computing Symposium*, pp. 71–76.
Y. Yoshida, et al., "GAVIEW—A Visualisation . . . Analyses", *1996 IEEE*, pp. 437–442.
A. Ishiguro, et al., "Decentralized Consensus–Making . . System", *IEEE*, 1996, pp. 82–87.

* cited by examiner

*Primary Examiner*—Mark R. Powell
*Assistant Examiner*—Anil Khatri
(74) *Attorney, Agent, or Firm*—Staas & Halsey LLP

(57) ABSTRACT

A system for executing a learning algorithm for solving an optimization problem of an evolutionary algorithm, etc. In this system, a learning algorithm executing device and a terminal device are interconnected by a network. In the terminal device, a change of an execution process of the learning algorithm may be set during the execution of the learning algorithm. In the learning algorithm executing device, the execution of the learning algorithm is continued according to the change of the execution process, which is set in the terminal device. As the change of the execution process of the learning algorithm, an execution condition of the learning algorithm is changed during its execution, or a visual or numerical change is made to an object representing the progress state of the execution of the algorithm on a display screen, in the terminal device.

39 Claims, 12 Drawing Sheets

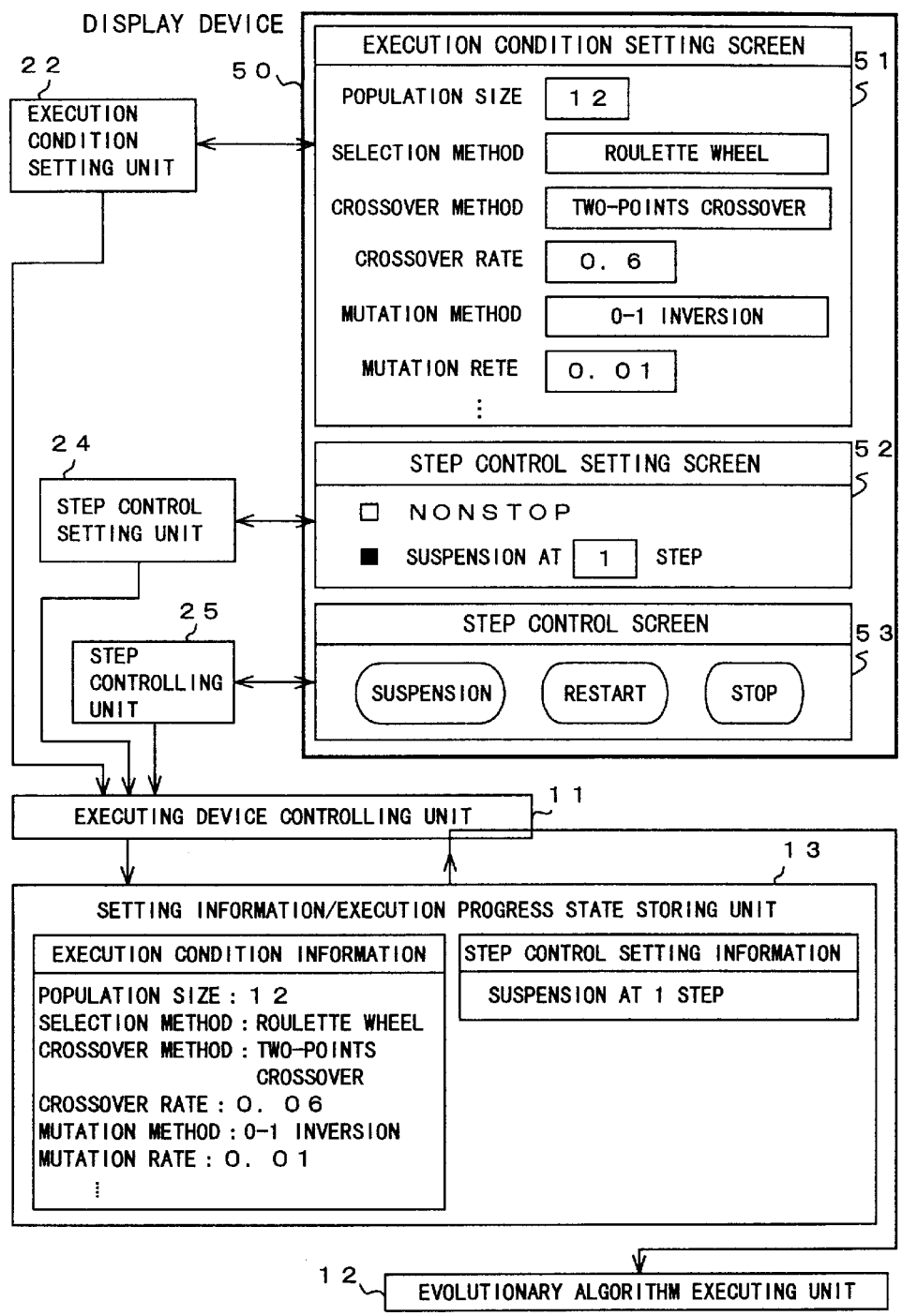
F I G. 2

(A) [STEP 0]
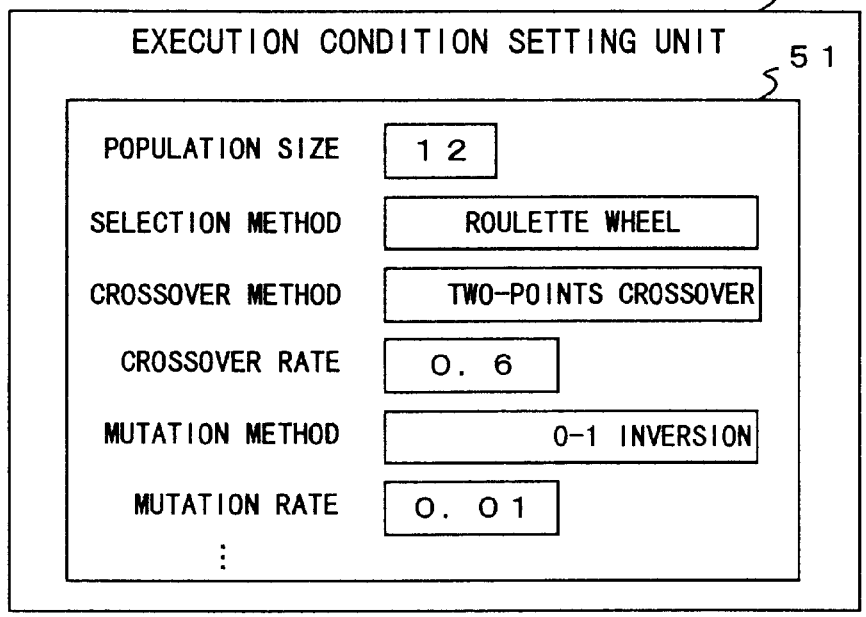
(B) [STEP 5]
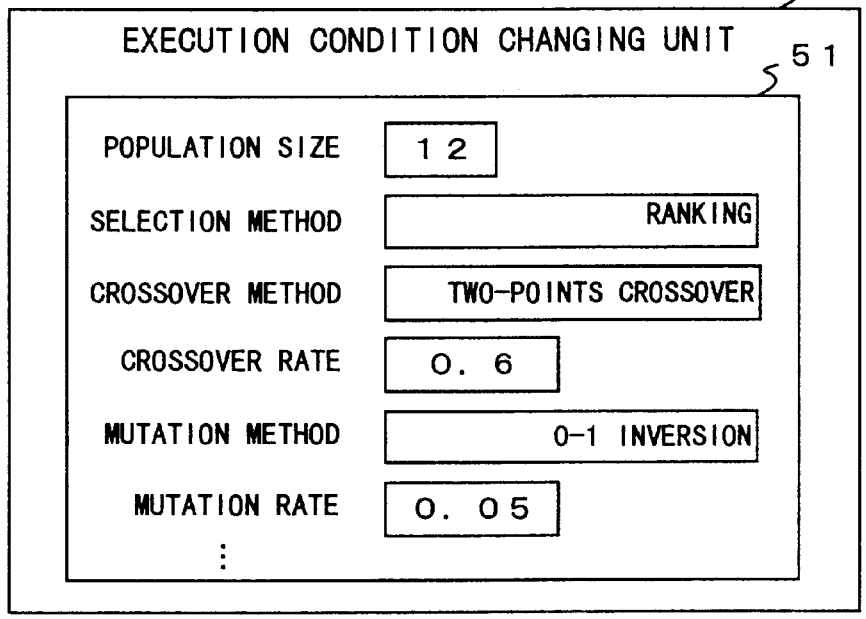
F I G. 4

(A)

SETTING INFORMATION/EXECUTION PROGRESS STATE STORING UNIT 13

EXECUTION CONDITION INFORMATION

STEP 0 -

POPULATION SIZE: 1 2
SELECTION METHOD: ROULETTE WHEEL
CROSSOVER METHOD: TWO-POINTS
 CROSSOVER
CROSSOVER RATE: 0. 6
MUTATION METHOD: 0-1 INVERSION
MUTATION RATE: 0. 0 1
 :

STEP CONTROL SETTING INFORMATION

SUSPENSION AT EVERY STEP

EXECUTION PROGRESS STATE

STEP 0: INDIVIDUAL a;
 INDIVIDUAL b; ···

(B)

SETTING INFORMATION/EXECUTION PROGRESS STATE STORING UNIT 13

EXECUTION CONDITION INFORMATION

STEP 0 - 4

POPULATION SIZE: 1 2
SELECTION METHOD: ROULETTE WHEEL
CROSSOVER METHOD: TWO-POINTS
 CROSSOVER
CROSSOVER RATE: 0. 6
MUTATION METHOD: 0-1 INVERSION
MUTATION RATE: 0. 0 1
 :

STEP 5 -

POPULATION SIZE: 1 2
SELECTION METHOD: RANKING
CROSSOVER METHOD: TWO-POINTS
 CROSSOVER
CROSSOVER RATE: 0. 6
MUTATION METHOD: 0-1 INVERSION
MUTATION RATE: 0. 0 5
 :

STEP CONTROL SETTING INFORMATION

SUSPENSION AT EVERY STEP

EXECUTION PROGRESS STATE

STEP 0: INDIVIDUAL a;
 INDIVIDUAL b; ···
STEP 1: INDIVIDUAL a;
 INDIVIDUAL b; ···
STEP 2: INDIVIDUAL a;
 INDIVIDUAL b; ···
STEP 3: INDIVIDUAL a;
 INDIVIDUAL b; ···
STEP 4: INDIVIDUAL a;
 INDIVIDUAL b; ···
STEP 5: INDIVIDUAL a;
 INDIVIDUAL b; ···
 :

F I G. 5

(A) [STEP 0]
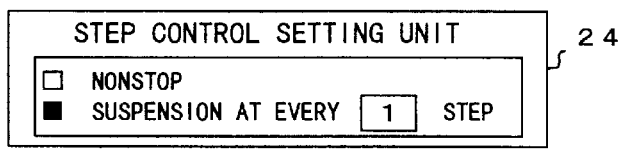
(B)
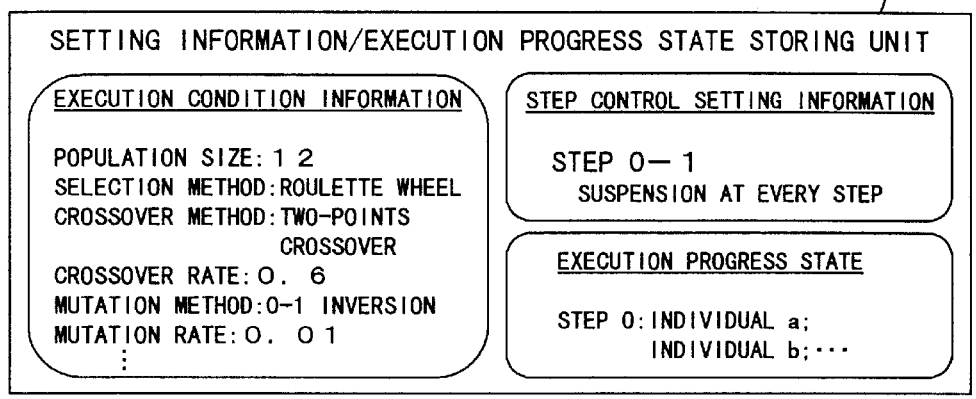
(C) [STEP 5]
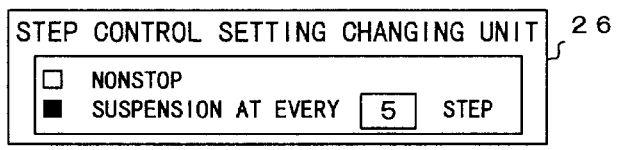
(D)
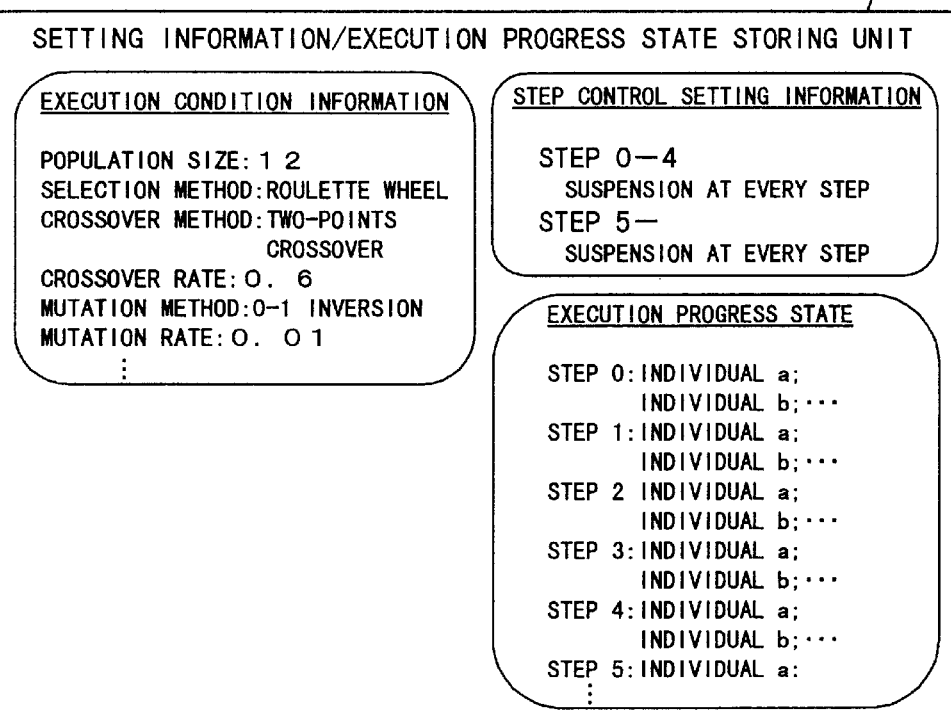
F I G. 6

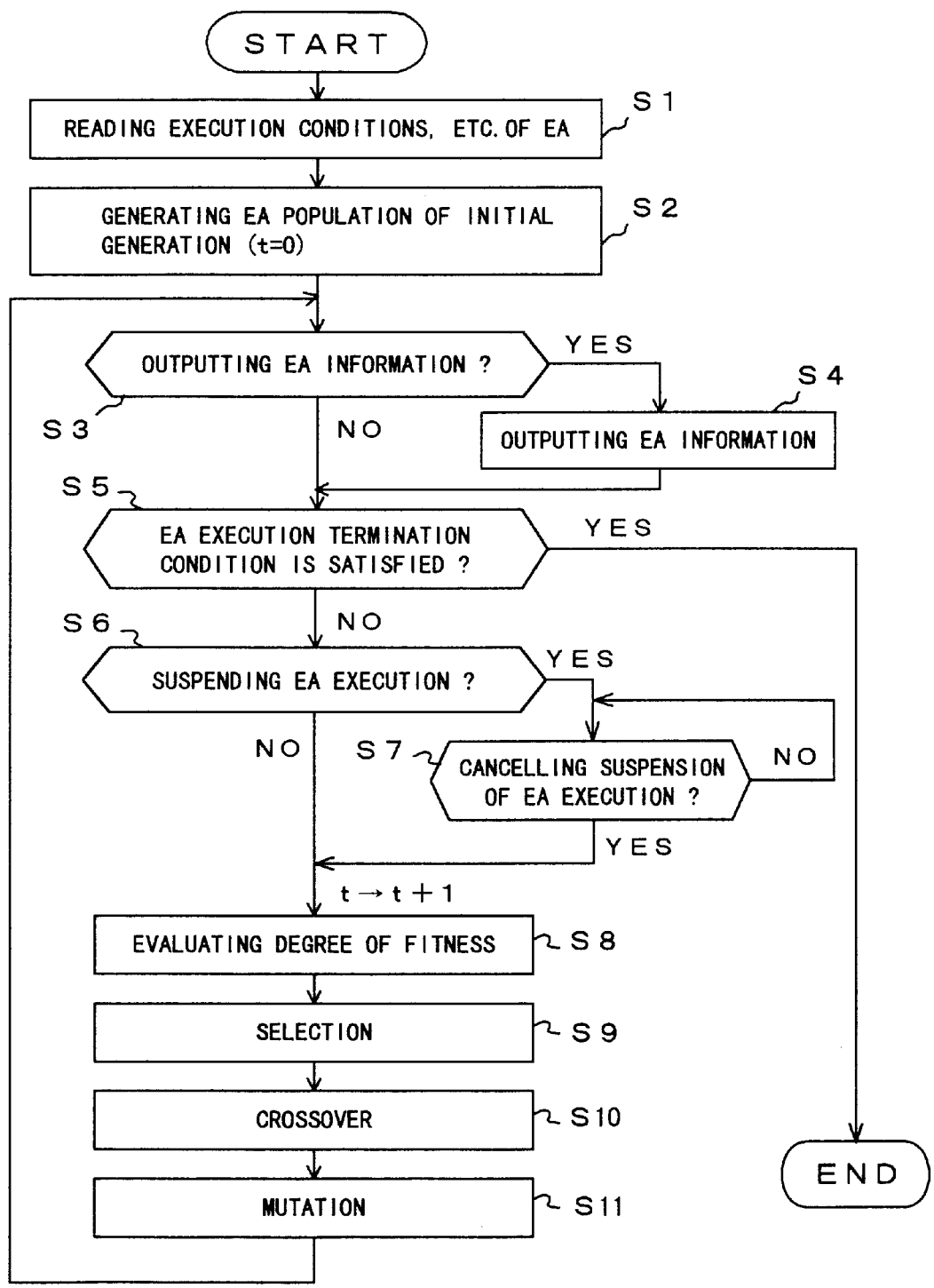
F I G. 8

SYSTEM, METHOD, AND PROGRAM STORAGE MEDIUM FOR EXECUTING A LEARNING ALGORITHM

BACKGROUND OF THE INVENTION

1. Field of the Invention

The present invention relates to a technique for obtaining an optimum solution or promising solutions to a problem according to a learning algorithm such as an evolutionary algorithm (EA), etc.

2. Description of the Related Art

Currently, the evolutionary algorithm, which is one of the learning algorithms, is applied to a variety of fields such as an LSI arrangement, image processing, scheduling, database classification, etc.

The evolutionary algorithm is a general term for problem-solving algorithms which use the evolution of living things as a model. The mechanism of a typical evolutionary algorithm is that a candidate of a solution to a given problem is recognized as an individual, and the whole of a population composed of individuals is evolved with the steps such as selection, crossover, etc., that is, the population is made to approach an optimum solution (or a semi-optimum solution or a feasible solution).

For example, a genetic algorithm (GA), which is most typical of the evolutionary algorithm, converts a group of solution candidates to a given problem into character strings each of which is recognized as a chromosome, defines a fitness function as a degree of suitability to a solution (that is, a chromosome), and performs the operations for changing a character string, which are recognized as the genetic operations such as selection according to the fitness, crossover, mutation, etc. A series of these genetic operations is regarded as a single generation and several generations are made to elapse so that an entire chromosome population approaches a better solution. A number of chromosomes with higher degrees of fitness emerge from the chromosome population by repeating the series of genetic operation steps for many generations. Consequently, an optimum solution or a semi-optimum solution can be obtained. "Genetic Algorithm" edited by Hiroaki KITANO (Sangyo Tosho ISBN 4-7828-5136-7) and "Genetic Algorithms in Search, Optimization and Machine Learning" edited by David E. Goldberg (Addison-Wesley Pub Co.; ISBN 0-201-15767-5) refer to the evolutionary algorithm and the genetic algorithm in detail.

The evolutionary algorithm can be applied to many types of problems. This algorithm has a characteristic that an optimum solution, a semi-optimum solution, or a feasible solution can be obtained to a large-scale and complicated problem, which is difficult to be solved with conventional methods.

In the evolutionary algorithm, there is a group of parameters (execution conditions) to be set for each given problem when the algorithm is executed, in order to improve its performance. By way of example, there are parameters such as a chromosome representation method, a fitness function, a selection method, a crossover method, a mutation method, etc. in a standard genetic algorithm.

A combination of execution conditions for obtaining the highest performance depends on the type, the scale, etc. of a problem, and its coordination is normally made according to a user's experience and the repetition of algorithm execution. It is said to be desirable that the behavior of the genetic algorithm is grasped in order to coordinate the execution conditions of the evolutionary algorithm and to improve its performance. However, it is not easy to handle the representations of a spatial distribution and a charge with time, namely, the evolution of a population, which is the characteristic of the evolutionary algorithm.

Conventionally, visualization was frequently used as a method for representing the behavior (and the performance) of an evolutionary algorithm. For example, the solution representation of each individual or the degree of suitability (the degree of fitness) of a solution in the evolutionary algorithm is plotted in a solution space or on a time axis by visualizing the behavior of the evolutionary algorithm, so that the behavior can be intuitively represented and displayed even if the execution of the evolutionary algorithm requires a relatively large-scale problem area, a large population, or a large amount of time.

A variety of methods for visualizing the evolutionary algorithm have been developed up to now. For example, the Japanese Laid-Open Patent Gazette No. 9-305565 "Genetic Algorithm Analysis and Display Processing Device" reciting the invention filed by the present applicant discloses the technique intended not only to implement a display visualized by various methods for the genetic algorithm, but to integrate the input and storage of execution conditions and the execution of a genetic algorithm, so that a user can efficiently coordinate the execution conditions and the performance is improved.

However, if the scale of a problem or of the evolutionary algorithm itself (the size of a population, the number of generations, etc.) is significantly large, a computer having the capability for performing high-speed arithmetic operations, and a sufficient disk capacity for storing the detailed record of the evolution of the evolutionary algorithm depending on need, is required. However, such a computer does not always comprise a desired graphics capability for visualizing the behavior of the evolutionary algorithm in a current situation. Therefore, it may sometimes be difficult to process both the execution and the visualized display of the evolutionary algorithm by using a single computer.

Additionally, with the conventional techniques, the visualized display capability does not greatly contribute to the improvement of the performance of the evolutionary algorithm. For example, the conventional techniques do not implement the capability for immediately changing an execution condition while viewing a visualized display, although the progress state of the execution of the evolutionary algorithm is visualized and displayed.

SUMMARY OF THE INVENTION

The present invention aims at overcoming the above described problems, and at providing a technique with which a user can be positively involved in the execution of a learning algorithm such as an evolutionary algorithm, and the performance of the learning algorithm is efficiently and dynamically improved.

The learning algorithm targeted by the present invention is an algorithm intended for machine learning, and includes an immune algorithm, a learning algorithm and a problem-solving algorithm implemented with a neural network or a fuzzy system, etc., in addition to the evolutionary algorithm such as a genetic algorithm, etc.

A system according to the present invention comprises a change processing unit for setting a change of the execution process of the learning algorithm during its execution, and an executing unit for continuing the execution of the learning algorithm according to the change of the execution process. The change processing unit may be a portion for setting a new execution condition of the learning algorithm during the execution of the learning algorithm. In this case, the executing unit may continue the execution of the learning algorithm under the new execution condition. Additionally, the change processing unit may set a new step progress controlling method of the learning algorithm during the execution of the learning algorithm. In this case, the executing unit may continue the execution of the evolutionary algorithm with the new step progress controlling method.

Here, the step of the evolutionary algorithm mean, for example, one generation or several generations of the genetic algorithm. However, the step may be a single genetic operation such as crossover, mutation, etc. in one generation. The step progress controlling method of the evolutionary algorithm is intended to, for example, automatically advance the evolutionary algorithm, suspend the algorithm at an arbitrary step, or suspend at every step or at every predetermined step.

Additionally, the system according to the present invention may further comprise a displaying unit for visualizing and displaying the progress state of the execution of a learning algorithm by using an object. In this case, the change processing unit can make a visual or numerical change to the object displayed by the displaying unit, and the executing unit can execute the learning algorithm after reflecting the contents of the change made to the object in the current learning algorithm. Here, the object means, for example, a visualized individual of the genetic algorithm. The object is changed, for example, by being moved on a screen, and this change is reflected in the evolutionary algorithm being executed.

The change processing unit may be arranged within a user terminal connected to a network, while the executing unit may be arranged within a learning algorithm executing device connected to the network. In this case, the learning algorithm executing device comprises a transmitting unit for transmitting to the user terminal the progress state of the execution process of the learning algorithm, which is performed by the executing unit, and the user terminal comprises a transmitting unit for transmitting to the learning algorithm executing device the change of the execution process of the learning algorithm, which is set by the change processing unit.

A device according to the present invention (such as a user terminal) is a device for controlling the execution of a learning algorithm for solving an optimization problem. The device comprises a change processing unit for setting a change of the execution process of the learning algorithm during its execution, and a transmitting unit for transmitting to a learning algorithm executing device the information about the change of the execution process of the learning algorithm, which is set by the change processing unit. This device may further comprise a displaying unit for visualizing and displaying the progress state of the execution of the learning algorithm, which is received from the learning algorithm executing device.

A further device according to the present invention (such as a learning algorithm executing device) is a device for executing a learning algorithm for solving an optimization problem. The device comprises a receiving unit for receiving the information about a change of the execution process when the change is made to the execution process of the learning algorithm during its execution, and an executing unit for continuing the execution of the learning algorithm according to the information about the change of the execution process, which is received by the receiving unit. This device may further comprise an outputting unit for outputting to the user terminal the progress state of the execution process of the learning algorithm, which is performed by the executing unit.

A still further device according to the present invention (such as a user terminal) comprises a processing unit for setting at least either of an execution condition and a step progress controlling method of the learning algorithm, and a transmitting unit for transmitting to the learning algorithm executing device at least either information of the execution condition and the step progress controlling method, which is set by the processing unit. Also this device may further comprise the displaying unit having the above described capability.

A still further device according to the present invention (such as a learning algorithm executing device) comprises a receiving unit for receiving from a terminal at least either information of the execution condition and the step progress controlling method of the learning algorithm, and an executing unit for continuing the execution of the learning algorithm according to at least either information of the execution condition and the step progress controlling method of the learning algorithm, which is received by the receiving unit. Also this device may further comprise the outputting unit having the above described capability.

A method according to the present invention is a method for executing a learning algorithm for solving an optimization problem. The method comprises a first step of setting a change of the execution process of the learning algorithm during its execution, and a second step of continuing the execution of the learning algorithm according to a change of the execution process when the change of the execution process is set during the execution of the learning algorithm. In the first step, a new execution condition of the learning algorithm may be set during its execution. In this case, the execution of the learning algorithm may be continued under the new condition in the second step. Additionally, a new step progress controlling method of the learning algorithm may be set during the execution of the learning algorithm in the first step. In this case, the execution of the evolutionary algorithm is continued with the new step progress controlling method in the second step.

This method may further comprise a step of visualizing and displaying the progress state of the execution of the learning algorithm by using an object. In this case, a visual or numerical change can be made to a displayed object in the first step, and the learning algorithm may be executed after the contents of the change made to the object are reflected in the current learning algorithm in the second step.

A further method according to the present invention is a method for controlling the execution of a learning algorithm for solving an optimization problem. The method comprises a step of setting a change of the execution process of the learning algorithm during its execution, and a step of transmitting to a learning algorithm executing device the information about the set change of the execution process of the learning algorithm. This method may further comprise a step of visualizing and displaying the progress state of the execution process of the learning algorithm.

A still further method according to the present invention is a method for executing a learning algorithm for solving an optimization problem. The method comprises a step of receiving from a terminal the information about a change of the execution process when the change is made to the execution process of the learning algorithm during its execution, and a step of continuing the execution of the learning algorithm according to the received information about the change of the execution process. This method may further comprise a step of outputting to the terminal the progress state of the execution process of the learning algorithm.

A still further method according to the present invention is a method for controlling the execution of a learning algorithm for solving an optimization problem. The method comprises a step of setting at least either of an execution condition and a step progress controlling method of the learning algorithm, and a step of transmitting to a learning algorithm executing device at least either information of the execution condition and the step progress controlling method of the learning algorithm, which is set in the setting step. This method may further comprise a step of visualizing and displaying the progress state of the execution process of the learning algorithm, which is received from the learning algorithm executing device.

A still further method according to the present invention is a method for executing a learning algorithm for solving an optimization problem. The method comprises a step of receiving from a terminal at least either of an execution condition and a step progress controlling method of the learning algorithm, and a step of continuing the execution of the learning algorithm according to at least either information of the execution condition and the step progress controlling method of the learning algorithm, which is received from the terminal. This method may further comprise a step of outputting to the terminal the progress state of the execution process of the learning algorithm.

The above described system, terminal, and learning algorithm executing device can be respectively implemented by using a computer. Each of the above described methods can be represented as a computer program in order to make a computer execute a learning algorithm.

A medium (storage medium) according to the present invention is a computer-readable medium storing a program for implementing a execution method of a learning algorithm for solving an optimization problem by using a computer. This execution method corresponds to any of the above described methods according to the present invention. This medium may be implemented as an external storage medium including an optical storage medium such as a CD-ROM, etc., a magnetic storage medium such as a floppy disk, etc., a magneto-optical storage medium such as an MO, etc. and the like, or an internal storage medium including a hard disk, a ROM, a RAM, and the like.

According to the present invention, a learning algorithm can be executed, for example, by a computer which can perform high-speed arithmetic operations, and an execution result can be visualized and displayed separately by another computer which is suitable for graphics operations, thereby obtaining an optimum solution or a solution candidate group in a short period of time. Additionally, an execution condition or an execution method can be changed during the execution of the learning algorithm, and the execution condition can be effectively changed while referencing the visualized display. As a result, a user can be positively involved in the evolution of the evolutionary algorithm, thereby screening the optimum solution at a higher speed.

BRIEF DESCRIPTION OF THE DRAWINGS

FIG. 2 is a schematic diagram for explaining the settings of execution conditions and a step progress controlling method of an evolutionary algorithm;

FIG. 4 shows schematic diagrams for explaining changes of the execution conditions during the execution of the evolutionary algorithm;

FIG. 5 shows schematic diagrams for explaining changes of the execution conditions during the execution of the evolutionary algorithm;

FIG. 6 shows schematic diagrams for explaining changes of the step progress controlling method during the execution of the evolutionary algorithm;

FIG. 8 is a flowchart showing the process performed by an evolutionary algorithm executing device;

DESCRIPTION OF THE PREFERRED EMBODIMENT

Provided below is the explanation about a learning algorithm according to a preferred embodiment of the present invention. This preferred embodiment uses an evolutionary algorithm as an example of the learning algorithm, and the system thereof is described below. However, the present invention may be applied to other types of learning algorithms and problem-solving algorithms such as an immune algorithm, etc. in addition to the evolutionary algorithm. Furthermore, the present invention may be applied also to machine learning including a neural network, a fuzzy system, etc.

Figure 1:
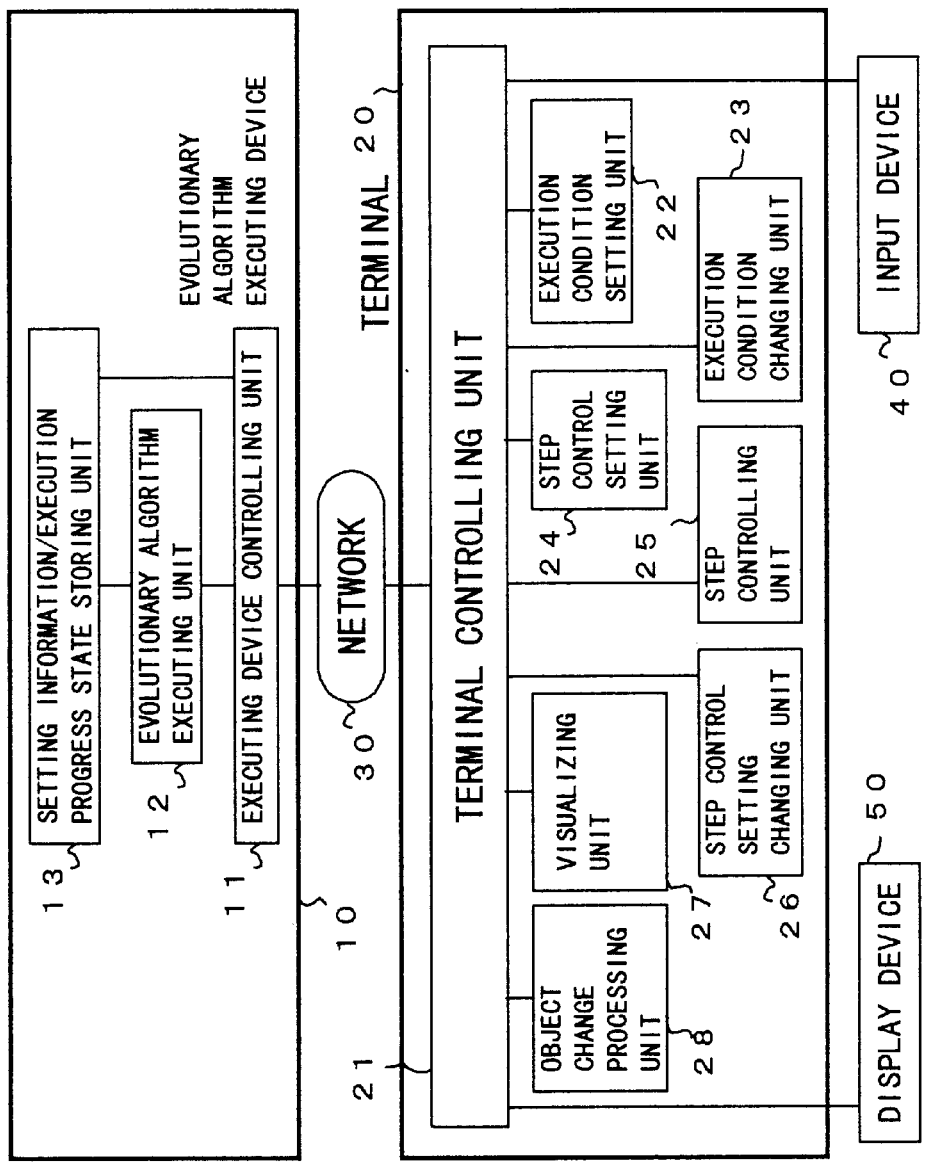
FIG. 1 is a block diagram exemplifying the configuration of an evolutionary algorithm executing system according to the present invention.

FIG. 1 is a block diagram exemplifying the configuration of an evolutionary algorithm executing system (simply referred to as an executing system hereinafter) according to the present invention.

This executing system comprises an evolutionary algorithm executing device (simply referred to as an executing device) 10, a terminal (an interface for an evolutionary algorithm) 20, and a network 30. The executing device 10 is configured by a computer composed of one or a plurality of CPUs, memories, etc., and is intended to execute the evolutionary algorithm. This executing device 10 is connected to the terminal 20 via the network 30, and transmits to the terminal 20 the progress state of the execution of the evolutionary algorithm, and receives from the terminal 20 the information such as the execution conditions of the evolutionary algorithm, the step progress controlling method, the contents of an object change, etc.

The terminal (terminal device) 20 is a device for providing the information for controlling the evolutionary algorithm executed by the evolutionary algorithm executing device 10. The information includes an execution condition set/change process, step control, a visualization process, an object change process, etc. The terminal 20 is connected to the executing device 10 via the network 30, receives from the executing device 10 the progress state of the execution of the evolutionary algorithm, and transmits to the executing device the information such as an execution condition of the evolutionary algorithm, a step progress controlling method, the contents of an object change, etc.

The network 30 is intended to interconnect the executing device 10 and the terminal 20. An input device 40 is configured, for example, by a keyboard, a mouse, etc., and is intended to input a control instruction to a terminal controlling unit 21 of the terminal 20. A display device 50 is intended to display the information provided by the terminal 20, and the result of the process for visualizing the progress state of the execution of the evolutionary algorithm, which is also provided by the terminal 20. Note that the terminal 20 may include the input device 40 and the display device 50.

The executing device 10 comprises an executing device controlling unit 11, an evolutionary algorithm executing unit 12, and a setting information/execution progress state storing unit 13. The executing device controlling unit 11 is a unit for performing various controls within the executing device 10. This unit controls the processes performed for the evolutionary algorithm executing unit 12 and the setting information/execution progress state storing unit 13, transmits to the terminal 20 via the network 30 the progress state of the execution of the evolutionary algorithm, and receives from the terminal 20 via the network 30 the information such as an execution condition of the evolutionary algorithm, a step progress controlling method, the contents of an object change, etc.

The evolutionary algorithm executing unit 12 is a unit for executing the evolutionary algorithm. The setting information/execution progress state storing unit 13 stores the execution conditions and the step progress controlling method of the evolutionary algorithm, and the contents of an object change, which are obtained via the executing device controlling unit 11, and stores the progress state of the execution of the evolutionary algorithm, which is obtained from the evolutionary algorithm executing unit 12.

The terminal 20 comprises the terminal controlling unit 21, an execution condition setting unit 22, an execution condition changing unit 23, a step control setting unit 24, a step controlling unit 25, a step control setting changing unit 26, a visualizing unit 27, and an object change processing unit 28.

The terminal controlling unit 21 is a unit for performing various controls within the terminal 20. This unit controls the processes performed by the execution condition setting unit 22, the execution condition changing unit 23, the step control setting unit 24, the step controlling unit 25, the step control setting changing unit 26, the visualizing unit 27, and the object change processing unit 28, receives from the evolutionary algorithm executing device 10 via the network 30 the progress state of the execution of the evolutionary algorithm, and transmits to the evolutionary algorithm executing device 10 via the network 30 the information such as an execution condition and a step progress controlling method of the evolutionary algorithm, and the contents of an object change, etc.

The execution condition setting unit 22 is a unit for setting an execution condition of the evolutionary algorithm. The execution condition changing unit 23 is a unit for changing an execution condition during the execution of the evolutionary algorithm. The step control setting unit 24 is a unit for setting the step progress controlling method of the evolutionary algorithm. The step controlling unit 25 is a unit for controlling the progress of the steps of the evolutionary algorithm. The step control setting changing unit 26 is a unit for changing the step progress controlling method during the execution of the evolutionary algorithm. The visualizing unit 27 is a unit for visualizing the progress state of the execution of the evolutionary algorithm. The object change processing unit 28 is a unit for processing a change when the change is made to an object representing the progress state of the execution of the evolutionary algorithm, which is visualized by the visualizing unit 27 and is displayed by the displaying unit 50.

Provided next is an explanation about the setting of execution conditions and a step progress controlling method.

In the system shown in FIG. 1, the evolutionary algorithm executing device 10 and the terminal 20 are interconnected via the network 30; the execution conditions set in the execution condition setting unit 22 and the step progress controlling method set in the step control setting unit 24 within the terminal 20, are transmitted to the evolutionary algorithm executing device 10, and the evolutionary algorithm is executed in the evolutionary algorithm executing unit 12 within the evolutionary algorithm executing device 10 under the execution conditions with the step progress controlling method. The progress state of the execution of the evolutionary algorithm is transmitted from the executing device 10 to the terminal 20. The progress state is then visualized by the visualizing unit 27 within the terminal 20, and its result is displayed on the screen of the displaying device 50. Furthermore, the progress of the steps of the evolutionary algorithm is controlled by the step controlling unit 25 within the terminal 20 depending on need.

The step progress controlling method set by the step control setting unit 24 is intended to make the settings such as advancing the evolutionary algorithm nonstop, suspending the algorithm at an arbitrary step, at every step, or at every predetermined step, etc. The timing at which the progress state of the execution of the evolutionary algorithm is transmitted/received, and the timing at which the algorithm is visualized and displayed may be set by the step control setting unit 24 independently from the step progress controlling method, or may be set in synchronization with the control of the steps.

As described above, the execution of the evolutionary algorithm, and the interface and the visualized display for controlling the execution of the evolutionary algorithm are processed by separate computers which are interconnected by the network 30, so that the execution of the evolutionary algorithm and the visualized display of the execution result can be respectively shared and processed by a computer which can perform high-speed arithmetic operations (evolutionary algorithm executing device 10) and a computer suitable for graphics operations (terminal 20).

Note that the scope of the present invention includes also the system for exchanging information between the executing device 10 and the terminal 20 not by using the network 30 but by using a different communicating means. Additionally, the scope of the present invention includes the system where the executing device 10 and the terminal 20 are not interconnected by the network 30, or a single device or computer which comprises the capabilities of the executing device 10 and the terminal 20.

Figure 3:
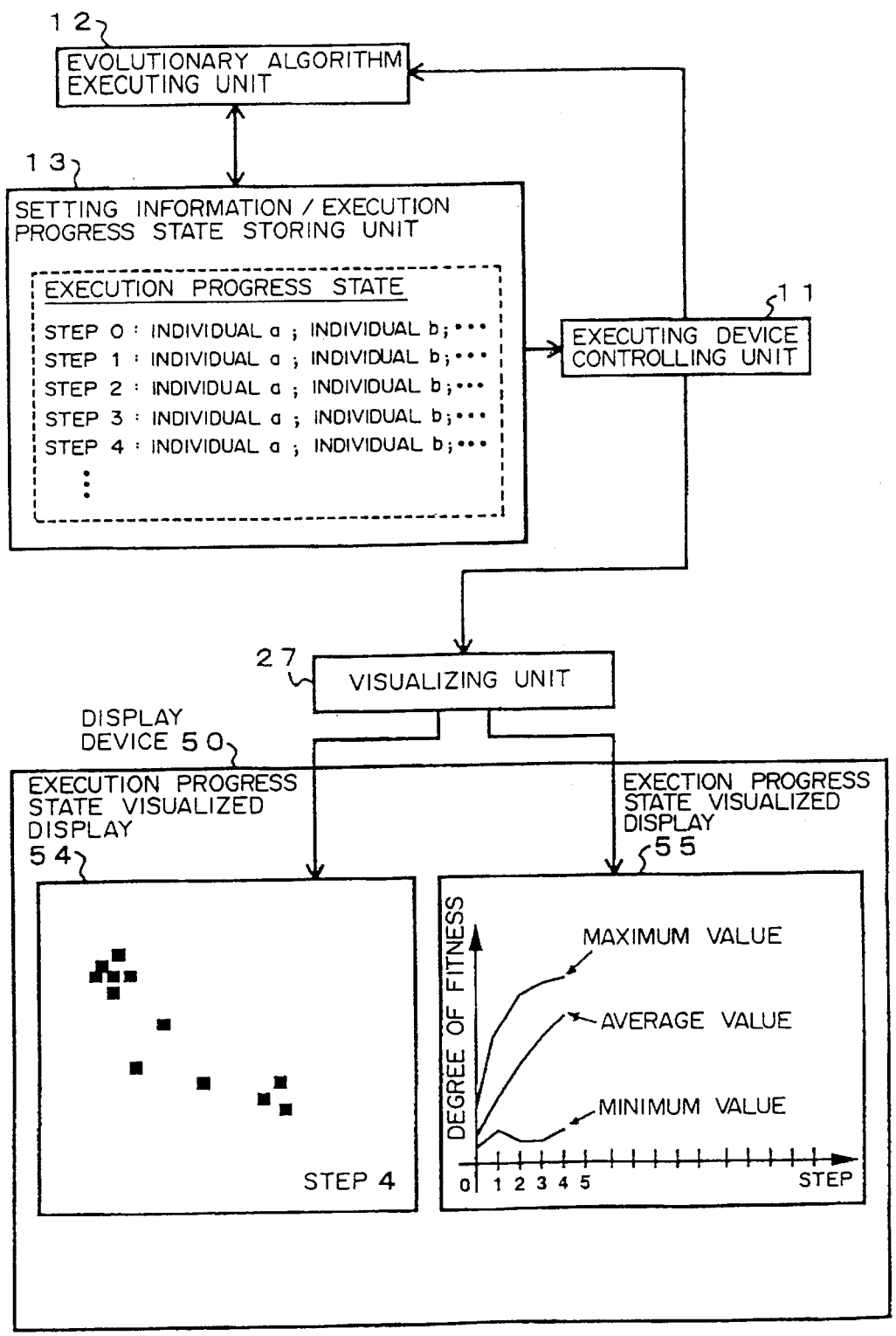
FIG. 3 is a schematic diagram for explaining the visualization of the progress state of the execution of the evolutionary algorithm.

FIG. 2 is a schematic diagram for explaining the settings of execution conditions and a step progress controlling method, which are made within the above described evolutionary algorithm executing system, while FIG. 3 is a schematic diagram for explaining the process for visualizing the progress state of the execution of the evolutionary algorithm executing system.

The execution condition setting unit 22 within the terminal 20 provides an interface for setting the execution conditions of the evolutionary algorithm.

As exemplified by an execution condition setting screen 51 of a display device 50 shown in FIG. 2, the execution conditions (and their values) to be set include a population size (12), a selection method (roulette wheel), a crossover method (two-points crossover), a crossover rate (0.6), a mutation method (0-1 inversion), a mutation rate (0.01), etc. The setting information of these execution conditions are transmitted from the terminal controlling unit 21 shown in FIG. 1 to the executing device controlling unit 11 within the evolutionary algorithm executing device 10 via the network 30, and are stored in the setting information/execution progress state storing unit 13.

The step control setting unit 24 within the terminal 20 provides the interface for setting the step progress controlling method of the evolutionary algorithm. In this figure, for example, either "nonstop" or "suspension at every predetermined step" can be selected as the step progress controlling method, as represented by the step control setting screen 52 of the display device 50 shown in FIG. 2. The "suspension at every predetermined step" (the specified number of steps= 1) is selected as the setting value in the example shown in FIG. 2. This step control setting information is transmitted from the terminal controlling unit 21 to the executing device controlling unit 11 within the evolutionary algorithm executing device 10 via the network 30, and is stored in the setting information/execution progress state storing unit 13.

The evolutionary algorithm executing unit 12 within the evolutionary algorithm executing device 10 executes the evolutionary algorithm based on the execution conditions and the step control setting information, which are stored in the setting information/execution progress state storing unit 13, and stores the execution progress state in the setting information/execution progress state storing unit 13.

The step controlling unit 25 within the terminal 20 provides an interface for controlling the progress of the steps of the evolutionary algorithm, which is executed by the evolutionary algorithm executing unit 12 within the evolutionary algorithm executing device 10.

The interface for controlling the steps is configured by three buttons which issue control instructions such as "suspension", "restart", and "stop", as exemplified by a step control screen 53 of the display device 50 shown in FIG. 2. When the step controlling unit 25 detects that any of the three buttons displayed on the screen has been pressed (or selected), the corresponding control instruction is issued from the terminal controlling unit 21 to the executing device controlling unit 11 within the evolutionary algorithm executing device 10 via the network 30, whereby the progress of the steps of the evolutionary algorithm, which are executed by the evolutionary algorithm executing unit 12, is controlled according to the issued instruction.

The evolutionary algorithm executing unit 12 sequentially stores the progress state of the execution of the evolutionary algorithm in the setting information/execution progress state storing unit 13 as shown in FIG. 3. The progress state of the execution of the evolutionary algorithm, which is stored in the setting information/execution progress state storing unit 13, is transmitted from the executing device controlling unit 11 to the terminal controlling unit 21 within the terminal 20 via the network 30. Then, the visualization process is performed by the visualizing unit 27 based on the progress state of the execution, and displayed by the display device 50.

In the example shown in FIG. 3, the execution of the evolutionary algorithm currently proceeds to step 4. An individual (solution candidate) distribution in a solution space in step 4 is displayed on an execution progress state visualized display 54. In the meantime, the degree of fitness varying with the progress of the steps is displayed as a graph representing the maximum, average, and minimum values of the degree of fitness at each of the steps on an execution progress state visualized display 55. Note that there are many other types of techniques for visualizing the progress state of the execution of the evolutionary algorithm. The visualized display according to the present invention is not limited to such a basic display of an individual distribution in a solution space or a display of the degree of fitness varying with the progress of the steps.

Provided next is the explanation about a change of an execution condition during the execution of the evolutionary algorithm.

An execution condition of the evolutionary algorithm can be changed by the execution condition changing unit 23 within the terminal 20 during the execution of the evolutionary algorithm. For example, if the degree of fitness of an individual included in a chromosome population is slow to be improved due to a low mutation rate of the genetic algorithm, which is initially set to, for example, 0.01, the degree of fitness can be adjusted to be effectively improved while verifying the changes of the maximum, average, and minimum values of the degree of fitness, for example, by raising the mutation rate from 0.01 to 0.05, etc.

As described above, the evolution capability of the evolutionary algorithm can be improved by interactively changing an execution condition or conditions of the evolutionary algorithm while visually referencing the progress state of the execution of the evolutionary algorithm during its execution.

FIGS. 4 and 5 are schematic diagrams for explaining changes made to the execution conditions. The other portions which are not illustrated in these figures are the same as those referred to in the above described example.

For example, as shown in (A) of FIG. 4, the population size (12), the selection method (roulette wheel), the crossover method (two-points crossover), the crossover rate (0.6), the mutation method (0-1 inversion), the mutation rate (0.01), etc. are set as the initial execution conditions of the evolutionary algorithm in the execution condition setting unit 22 in a similar manner as in the example shown in FIG. 2. These items of information are stored along with the other items of information in the setting information/execution progress state storing unit 13 as shown in (A) of FIG. 5.

Here, assume that execution conditions are changed before step 5 is started. The change operations are performed in the execution condition changing unit 23 within the terminal 20. Because the types of the execution conditions to be handled are the same, the interface of the execution condition changing unit 23 may be similar to the screen 51 of the execution condition setting unit 22. In the example shown in (B) in FIG. 4, a user has changed the selection method from the roulette wheel to a ranking method, and the mutation rate from 0.01 to 0.05 among the execution conditions. The contents of these changes are transmitted to the evolutionary algorithm executing device 10, and are stored in the setting information/execution progress state storing unit 13, as shown in (B) of FIG. 5. As a result, the evolutionary algorithm is executed under these new execution conditions in and after step 5.

Provided next is the explanation about a change of the step progress controlling method of the evolutionary algorithm during its execution.

The step progress controlling method of the evolutionary algorithm can be changed by the step control setting changing unit 26 within the terminal 20 during the execution of the evolutionary algorithm. The number of steps executed at one time of the evolutionary algorithm can be increased/decreased, for example, by changing from the "suspension at every step" to "suspension at every 5th step."

As described above, the progress state of the evolutionary algorithm can be displayed at the timing that a user desires by allowing the step progress controlling method to be changed during its execution. Additionally, the progress of the evolutionary algorithm can be efficiently made by changing an execution condition on a screen displayed in such a manner.

FIG. 6 shows schematic diagrams for explaining a change of the step progress controlling method. The other portions not shown in this figure are the same as those referred to in the above described example.

As shown in (A) of FIG. 6, "suspension at every step" is set in the step control setting unit 24 as the initial step progress controlling method of the evolutionary algorithm in a similar manner as in the example shown in FIG. 2. This setting is stored along with the other items of information of the evolutionary algorithm in the setting information/execution progress state storing unit 13 as shown in (B) of FIG. 6.

Here, assume that the initial step control setting is changed before step 5 is started. The change operation is performed by the step control setting changing unit 26. Since the type of the step progress controlling method to be handled is the same, the interface for the step control setting changing unit 26 may be similar to that of the step control setting unit 24. In this example, "suspension at every step" is changed to "suspension at every 5th step" as shown in (C) of FIG. 6. The content of this change is transmitted to the evolutionary algorithm executing device 10, and is stored in the setting information/execution progress state storing unit 13, as shown in (D) of FIG. 6. As a result, the execution of the evolutionary algorithm is suspended at every 5th step in and after step 5.

Provided next is the explanation about the case where an object of the evolutionary algorithm is forcibly changed according to a user instruction. The object of the evolutionary algorithm is, for example, a visual display of an individual (solution candidate) of the genetic algorithm.

A visual or numerical change is made to the object representing the progress state of the evolutionary algorithm, which is visualized and displayed by the display device 50, via the input device 40 such as a mouse, a keyboard, etc. This change is processed by the object change processing unit 28, and then transmitted to the evolutionary algorithm executing device 10 via the network 30. The evolutionary algorithm executing device 10 reflects the transmitted change in the evolutionary algorithm being executed within the evolutionary algorithm executing unit 12.

As described above, a user can be positively involved in the evolution of the evolutionary algorithm while referencing the visualized display of the progress state of the execution of the evolutionary algorithm, and can accelerate the evolution of the evolutionary algorithm, by allowing the object to be changed during the execution of the evolutionary algorithm.

Figure 7:
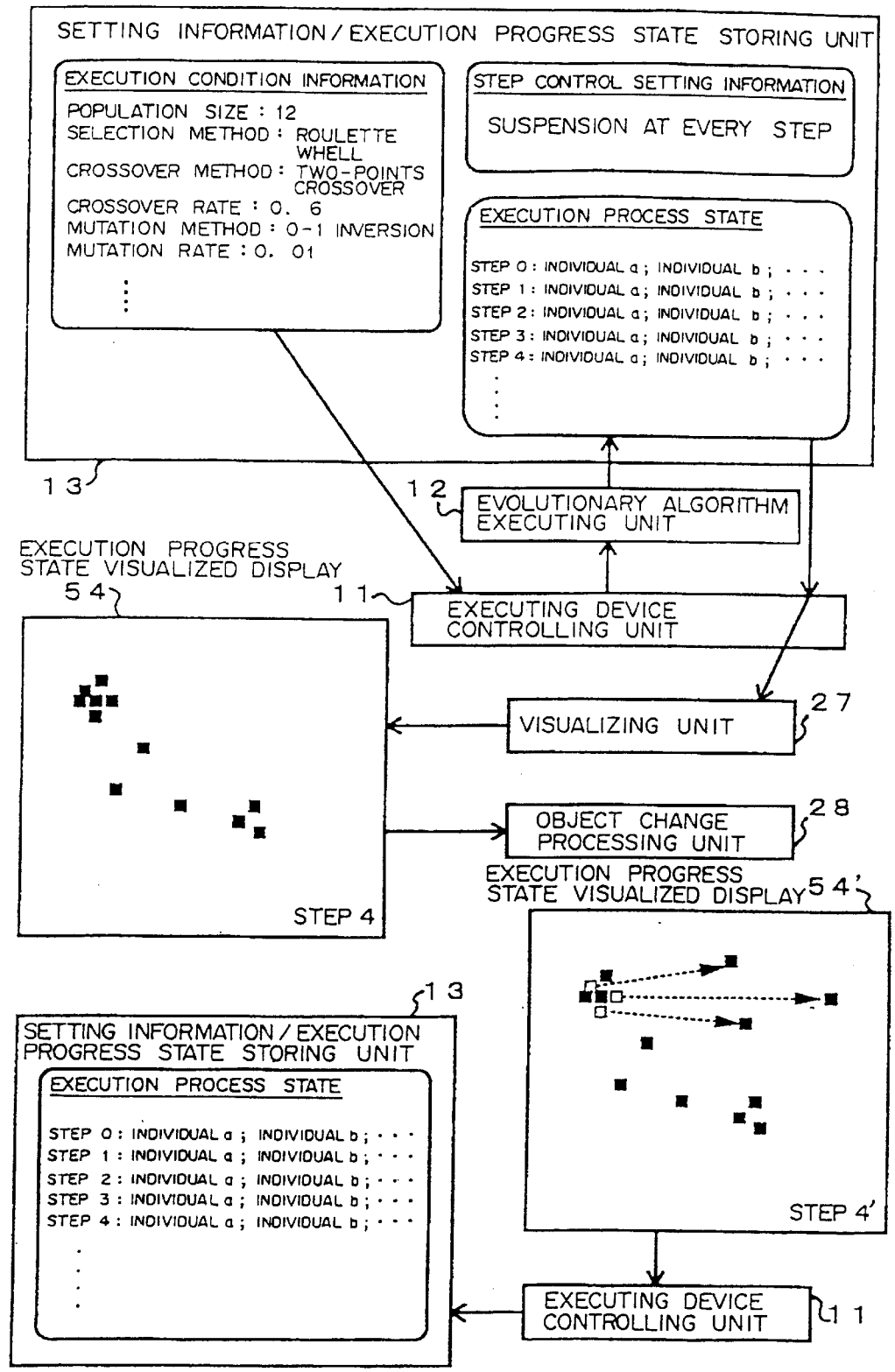
FIG. 7 is a schematic diagram for explaining changes made to objects.

FIG. 7 is a schematic diagram for explaining a change of the object, which is made by the evolutionary algorithm executing system according to this preferred embodiment. The other portions not shown in this figure are the same as those referred to in the above described example.

In the evolutionary algorithm executing device 10, the evolutionary algorithm executing unit 12 executes the evolutionary algorithm based on the execution condition information and the step control setting information, which are stored in the setting information/execution progress state storing unit 13, under the control of the executing device controlling unit 11, and stores the progress state of the execution in the setting information/execution progress state storing unit 13.

The progress state of the execution stored in the setting information/execution progress state storing unit 13 is transmitted from the executing device controlling unit 11 to the terminal 20 via the network 30. In the terminal 20, for example, an individual distribution in a solution space is displayed by the display device 50 as on the execution progress state visualized display 54 based on the progress state of the execution received by the visualizing unit 27. The respective points on the execution progress state visualized display 54 are the objects representing the states of respective individuals during the execution of the evolutionary algorithm.

Here, if a user determines that an optimum solution is difficult to be obtained, for example, due to the individual distribution biased to the upper left portion on the execution progress state visualized display 54, the user can change some of the objects displayed on the execution progress state visualized display 54 by the object change processing unit 28.

In this example, the changes indicated by broken line arrows are made to some of the objects displayed on the execution progress state visualized display 54 by the object change processing unit 28. Specifically, each of these changes is made by selecting an object and dragging the selected object to a desired position with the input device 40 such as a mouse, etc. on the display screen. An object may be changed with a numerical value input from a keyboard, etc. If the position of an object is represented by a multi-dimensional variable, a user can display the object by specifying the coordinate axis of the dimension that the user desires, and can perform the operation for the displayed object.

The content of the change made to the object is transmitted to the evolutionary algorithm executing device 10 from the terminal 20 via the network 30, and is stored in the setting information/execution progress state storing unit 13 via the executing device controlling unit 11. The evolutionary algorithm executing unit 12 receives the new information about the object, which is stored in the setting information/execution progress state storing unit 13, via the executing device controlling unit 11, and reflects the received information in the next step of the evolutionary algorithm.

If the content of the change made to the object is reflected in a solution candidate population, the content of the corresponding individual will be changed, specifically, with the inverse conversion performed when an individual which is a solution candidate is visualized by the visualizing unit 27. As a result, the solution candidate population of step 4 is changed to that of step 4', and the evolutionary algorithm executing unit 12 executes the next step of the evolutionary algorithm based on the new solution candidate population of step 4'. For example, if the chromosome of a changed individual includes a fatal gene in the genetic algorithm, some correction is desired to be made to the contents of the change so that the chromosome does not include the fatal gene in the neighborhood of the changed object.

Since the correction depends on the representation of the chromosome for a solution to a given problem, its detailed explanation is omitted here.

The above described settings and changes of the execution conditions and the step progress controlling method, and the change of the object may be individually implemented or may be combined and implemented, according to the present invention.

Provided next is an explanation of the flow of the process performed by the evoluntionary algorithm executing device 10.

FIG. 8 is a flowchart showing the process performed by the evolutionary algorithm executing device 10.

The processes performed by the executing device controlling unit 11 and the evolutionary algorithm executing unit 12 will be explained as being typical of the evolutionary algorithm (hereinafter abbreviated to EA) by using the genetic algorithm.

First of all, the execution condition information and the step control setting information of the EA, which are transmitted from the terminal 20 via the network 30, are read via the executing device controlling unit 11 (step S1).

Next, the EA population in an initial generation (t=0: "t" is the number of generations) is generated according to the population size specified as an execution condition (step S2). If the instruction for outputting the EA information such as the execution progress state, etc. is transmitted from the terminal 20 via the network 30 ("YES" in step S3), the EA information is output (step S4). If the output instruction is not transmitted ("NO" in step S3), the process goes to the next step S5.

It is then determined whether or not an EA execution termination condition is satisfied (step S5). The satisfaction of the EA execution termination condition is judged by determining whether or not the number of generations reaches a predetermined number, whether or not the maximum value of the degree of fitness becomes equal to or larger than a predetermined value, whether or not a feasible solution can be obtained, etc. The EA execution termination condition may be added to the execution conditions set by the terminal 20 as one condition. If the EA execution termination condition is satisfied ("YES" in step S5), the execution of the EA is terminated.

If the EA execution termination condition is not satisfied ("NO" in step S5), it is further determined whether or not to suspend the execution of the EA (step S6). If the instruction for suspending the execution of the EA is transmitted from the terminal 20 via the network 30 ("YES" in step S6), the execution of the EA is suspended. If the instruction for cancelling the suspension of the execution of the EA is transmitted after that ("YES" in step S7), the suspension is cancelled. The number of generations "t" is then incremented by "1" and the process goes to the next step S8. If the instruction for suspending the execution of the EA is not transmitted ("NO" in step S6), the number of generations "t" is incremented by "1" and the process immediately goes to step S8.

Next, the degree of fitness of each individual in the EA population is evaluated according to a predetermined fitness function (step S8). Then, selection is made according to the rule of the survival of the fittest, which deletes an individual with a lower degree of fitness and makes an individual with a higher degree of fitness survive, or leaves a number of replications of the individual with the higher degree of fitness (step S9).

Then, the crossover between the individuals that survived in the selection step, that is, the exchange of genetic information is performed according to the crossover rate with the crossover method, which are set as the execution conditions, in terms of probability (step S10). Then, a probability change is made to part of the genetic information of an individual with the mutation method and the mutation rate, which are set as the execution conditions (step S11). The process goes back to step S3 after step S11, and is repeated in a similar manner.

Here, the process is explained by using the genetic algorithm (GA) as being typical of the evolutionary algorithm (EA). The characteristic steps as the GA are the evaluation of the degree of fitness (step S8), the selection (step S9), the crossover (step S10), and the mutation (step S11). If another EA method is used, these steps will be replaced with other operations. Furthermore, since the genetic algorithm itself has various derivative methods, these steps may be sometimes replaced with other operations or a different step may be added depending on the type of the genetic algorithm.

Provided next is an explanation of the flow of the process performed by the terminal 20.

Figure 9:
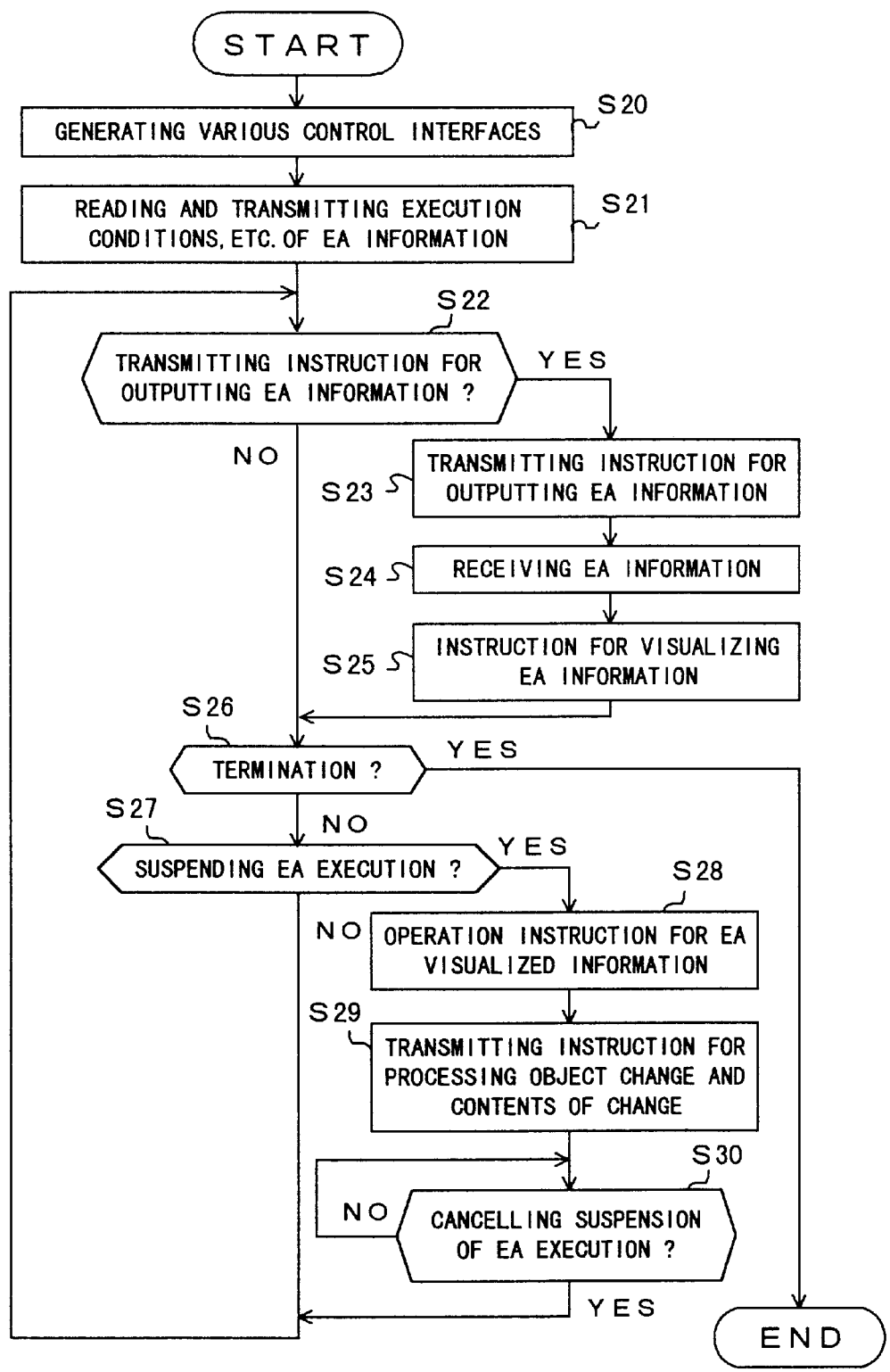
FIG. 9 is a flowchart showing the process performed by a terminal.

FIG. 9 is a flowchart showing the process performed by the terminal 20.

First of all, various types of control interfaces such as an execution condition setting screen for an EA execution condition input, etc. are generated (step S20).

Next, the execution conditions of the EA are input on the execution condition setting screen 51 shown in FIG. 2, and the step progress controlling method is input on the step control setting screen 52. Then, the input conditions and method are transmitted to the evolutionary algorithm executing device 10 via the network 30 (step S21).

If the instruction for outputting the EA information is provided with the above described control interfaces, etc. ("YES" in step S22), the process goes to step S23. If the output instruction is not provided ("NO" in step S22), the process goes to step S26. The instruction for outputting the EA information is transmitted to the evolutionary algorithm executing device 10 via the network 30 in step S23. The process then goes to step S24.

In step S24, the EA information such as the progress state of the execution, etc. are received from the evolutionary algorithm executing device 10 via the network 30. In step S25, the instruction for visualizing the received EA information is transmitted to the visualizing unit 27 where the EA information is statistically and variously processed, and the process results are visualized and displayed by the display device 50. The process then goes to step S26.

In step S26, if the instruction for terminating the system is received via the above described control interfaces (for example, the "stop" button displayed on the step control screen 53 shown in FIG. 2 is pressed) ("YES" in step S26), the process of the terminal 20 is terminated. If the instruction for terminating the system is not received ("NO" in step S26), the process goes to the next step S27.

In step S27, if the instruction for suspending the EA execution is provided from the step control screen 53 shown in FIG. 2 ("YES" in step S27), this instruction is transmitted to the evolutionary algorithm executing device 10 via the network 30, and the process goes to step S28. The process goes to step S28. If the instruction for suspending the EA execution is not provided ("No" in step S27), the process goes back to step S22 and is repeated in a similar manner.

In step S28, each of the operation instructions issued via the interface which is provided by the visualizing unit 27 is controlled for the visualized information of the EA, which is displayed by the visualizing unit 27.

These operation instructions include an instruction for displaying the detailed information of an individual on a pop-up window if the individual is clicked with a mouse, for example, on the execution progress state visualized display where the individual distribution of a certain generation in a solution space is plotted, and for simultaneously highlighting the position of the degree of fitness corresponding to the individual in a generation change graph of the degree of fitness, and also an instruction for changing the scale of a display.

In step S29, if the instruction which is operated on any of the interfaces provided by the visualizing unit 27 is an instruction for changing an object, this instruction is transmitted to the object change processing unit 28 and the content of the change of the object, which is the processed result, is transmitted to the evolutionary algorithm executing device 10 via the network 30.

Then, if the "restart" button is pressed on the step control screen 53 shown in FIG. 2 and the instruction for cancelling the suspension of the EA execution is provided ("YES" in step S30), the suspension is cancelled. At the same time, the process goes back to step S22 and is repeated in a similar manner.

Figure 10:
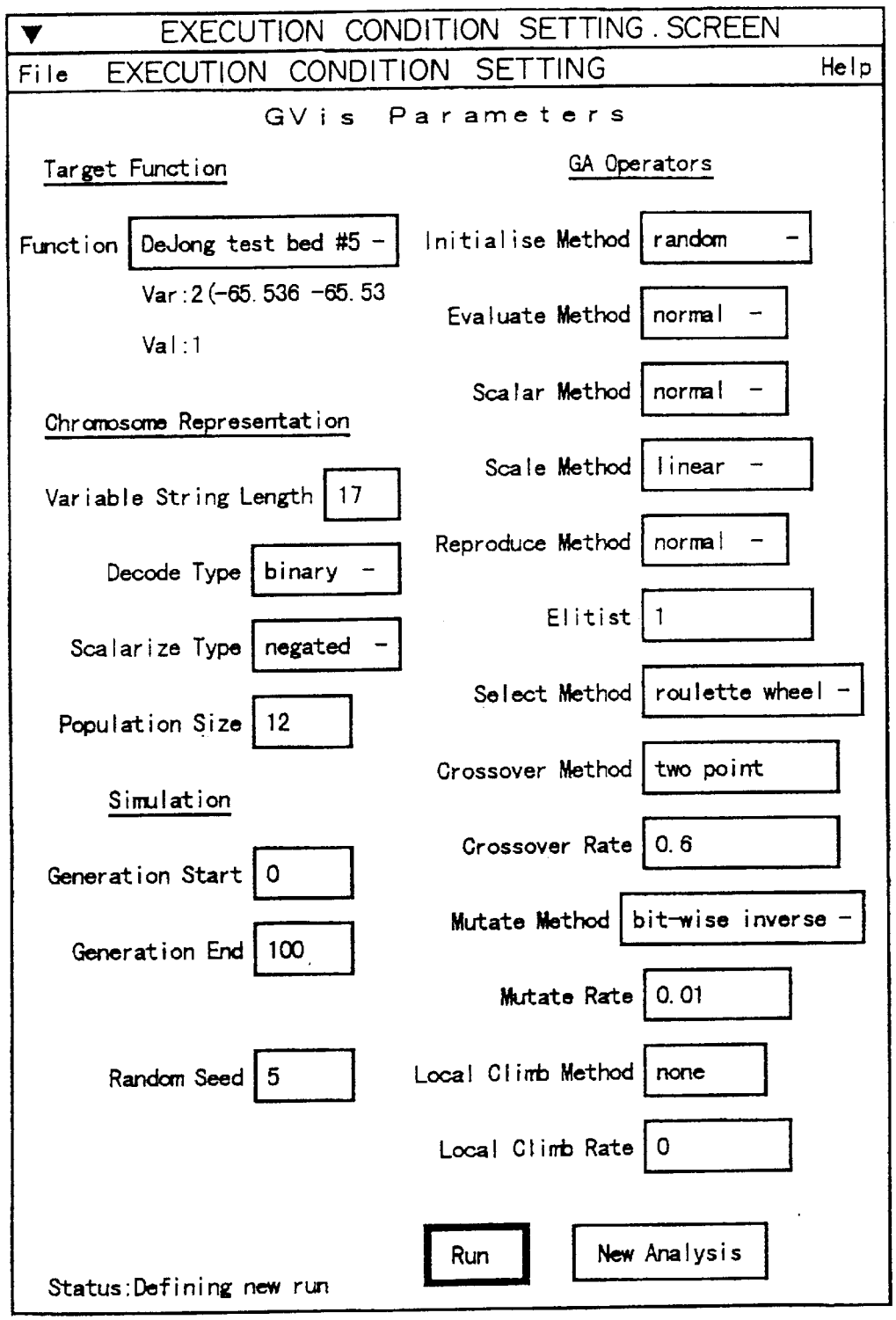
FIG. 10 shows the specific example of an execution condition setting screen.

FIG. 10 shows the specific example of the execution condition setting screen 51.

The execution condition setting screen 51 shown in FIG. 10 is a screen for setting the execution conditions of the genetic algorithm (GA) with the terminal 20. For example, a chromosome representation method for an individual, the size of a chromosome population, an execution start generation, an execution end generation, etc. can be set on this screen. Furthermore, various GA operations such as the select (selection) method, the crossover method, the crossover rate, the mutate (mutation) method, the mutate (mutation) rate, etc. can be set. These settings can be made not only prior to the execution of the evolutionary algorithm, but also during the execution.

Figure 11:
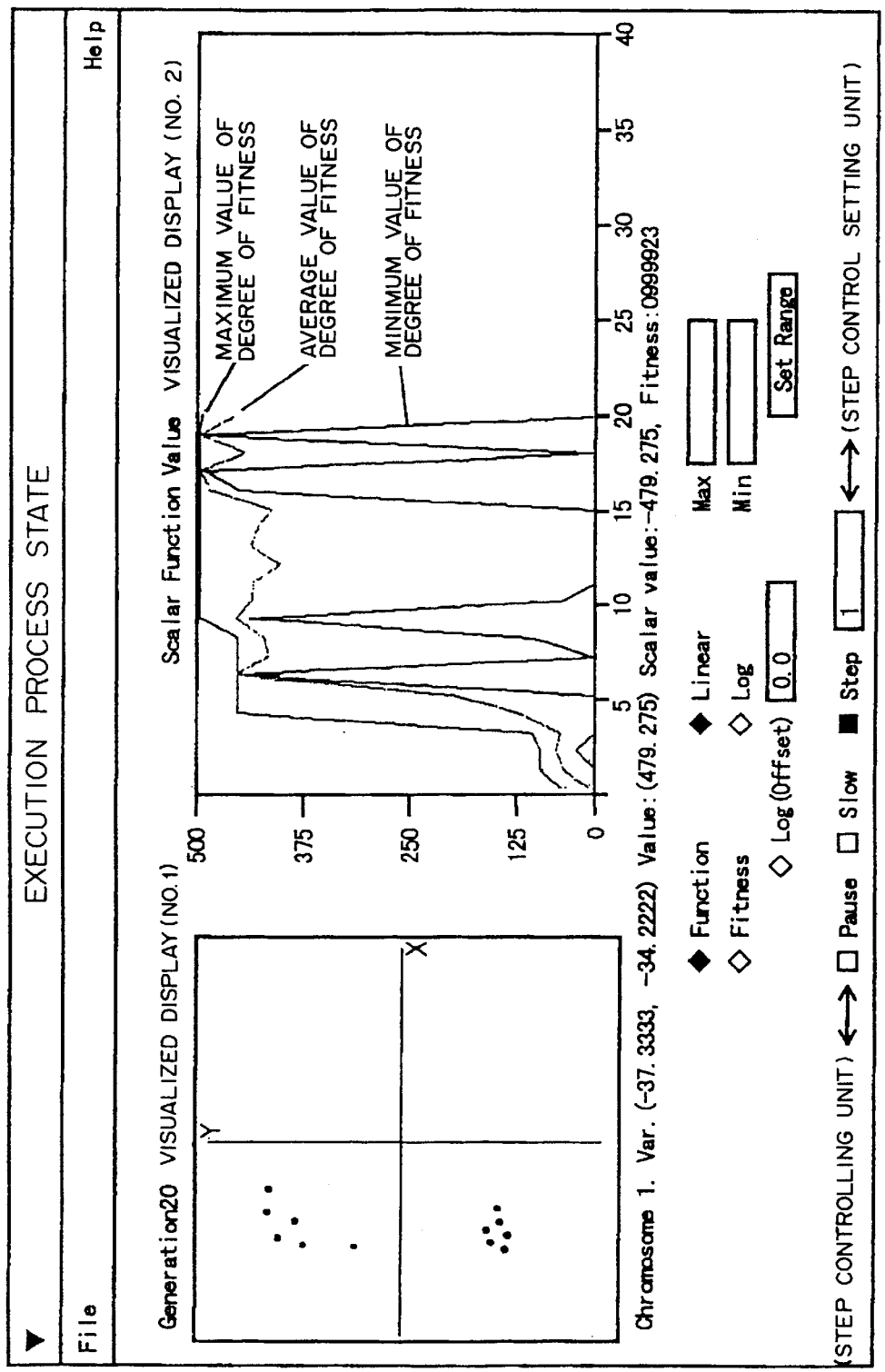
FIG. 11 shows the specific example of a visualized display screen of the progress state of execution.

FIG. 11 shows the specific example of a visualized display screen such as an execution progress state, etc.

On the visualized display screen shown in FIG. 11, a visualized display (No. 1) represents the individual distribution of the twentieth generation in a solution space in the execution of the genetic algorithm for solving an optimization problem of a two-variable function. In the meantime, a visualized display (No. 2) represents the generation change graph of the maximum, average, and minimum values of the degree of fitness of the chromosome populations from the 0th generation to the twentieth generation in the execution of the genetic algorithm for solving the optimization problem of the two-variable function. With this graph display, the range of the degree of fitness to be displayed, whether the degree of fitness is displayed either on a linear scale or on a log scale, and the like can be set.

A "Pause" button corresponds to the "suspension/restart" button displayed on the step control setting screen 52 or the step control screen 53, which are shown in FIG. 2. A "Slow" button corresponds to the "nonstop" button. A "Step" button corresponds to the "suspension at every predetermined step" button. If the "suspension at every predetermined step" is selected, a predetermined step can be input as a numerical value to the input field at the right side.

Figure 12:
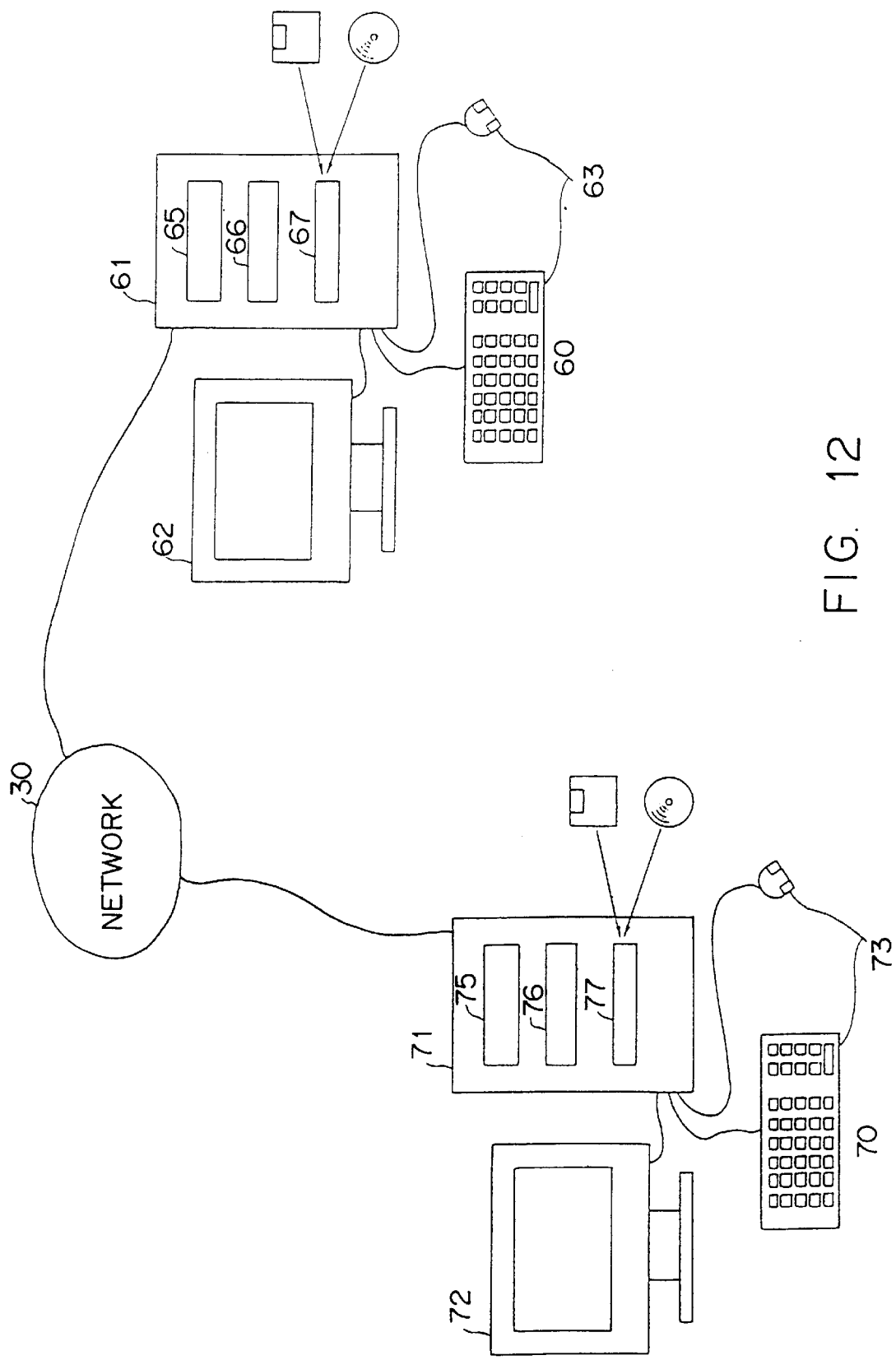
FIG. 12 is a schematic diagram showing the configuration of a computer system which implements the system according to the present invention.

FIG. 12 shows the example where the evolutionary algorithm executing system shown in FIG. 1 is implemented by a computer system.

As shown in this figure, this system comprises a computer 60 as the evolutionary algorithm executing device 10; a computer 70 corresponding to the terminal 20, the input device 40, and the display device 50; and the network 30 which is responsible for the communication between these two computers. If the capabilities of the evolutionary algorithm executing device 10 are written as a computer program, the computer 60 performs the processes of the evolutionary algorithm executing device 10 according to the computer program. If the capabilities of the terminal 20 are written as a computer program, the computer 70 performs the processes of the terminal 20 according to the computer program.

The computer 60 comprises a main body 61 including a processor 65, a memory 66, and a storage medium driver 67; a display 62; and an input device 63 composed of a keyboard and a mouse. The processor 65 includes a CPU, etc., and the memory 66 may include a ROM, a RAM, a hard disk, etc. The processor 65 executes the capabilities of the executing device controlling unit 11 and the evolutionary algorithm executing unit 12, which are included in the executing device 10. The memory 66 stores the data stored in the setting information/execution progress state storing unit 13, and the program and data required for the operation of the processor 65.

A driver 67 is intended to load the data and program stored on an external storage medium into the processor 65 or the memory 66. If the storage medium according to the present invention is an external storage medium storing a part or the whole of the computer program for executing the capabilities of the evolutionary algorithm executing device 10, this program is loaded into the main body 61 of the computer 60 via this driver 67. Note that the input device 63 is used by a user in order to make inputs required for executing the program. The display 62 is intended to display an input status or an execution result depending on need.

The computer 70 comprises a main body 71 including a processor 75, a memory 76, and a storage medium driver 77; a display 72; and an input device 73 composed of a keyboard and a mouse. The processor 75 includes a CPU, etc. The memory 76 may include a ROM, a RAM, a hard disk, etc. The processor 75 executes the capabilities of the terminal controlling unit 21, the execution condition setting unit 22, the execution condition changing unit 23, the step control setting unit 24, the step controlling unit 25, the step control setting changing unit 26, the visualizing unit 27, and the object change processing unit 28, which are included in the terminal 20. The memory 76 stores the program and data required for the operation of the processor 75.

The driver 77 is intended to load the data and program stored on an external storage medium into the processor 75 or the memory 76. If the storage medium according to the present invention is an external storage storing a part or the whole of the computer program for executing the capabilities of the terminal 20, this program is loaded into the main body 71 via this driver 77. Note that the display 72 and the input device 73 respectively correspond to the display device 50 and the input device 40.

If the storage medium according to the present invention is an external storage medium, it is implemented by an optical storage medium such as a CD-ROM, etc., a magnetic storage medium such as a floppy disk, etc., and a magneto-optical storage medium such as an MO, etc. The storage medium according to the present invention may be implemented also as an internal storage medium such as a hard disk, a ROM, a RAM, etc.

According to the present invention, the following effects can be achieved.

(1) The execution of a learning algorithm, and the interface and the visualized display for its control can be processed by separate computers interconnected via a network. Accordingly, the learning algorithm is executed by a computer which can perform high-speed arithmetic operations, while an execution result is visualized and displayed by a computer suitable for graphics operations, thereby quickly searching for an optimum solution or a solution candidate group.

(2) Since the execution conditions or the execution method can be changed during the execution of the learning algorithm, the optimum solution or the solution candidate group can be quickly searched for.

(3) Since the execution conditions can be changed while referencing the visualized display, a user can set the expansion of the learning algorithm in an interactively optimum direction while viewing a display screen.

(4) Since an object can be arbitrarily changed during the execution of the learning algorithm, the user can be positively involved in the search for the solution candidate group, thereby further improving the solution search speed of the learning algorithm.

What is claimed is:

1. A system for executing a learning algorithm for solving an optimization problem, wherein the system improves performance of the learning algorithm, comprising:
   a change processing device setting a change of an execution process of the learning algorithm during execution of the learning algorithm; and
   an executing device continuing the execution of the learning algorithm according to the change of the execution process, if the change of the execution process is set during the execution of the learning algorithm.

2. The system according to claim 1, wherein:
   said change processing device sets a new execution condition of the learning algorithm during the execution of the learning algorithm; and
   said executing device continues the execution of the learning algorithm under the new execution condition.

3. The system according to claim 1, wherein:
   said change processing device sets a new step progress controlling method of the learning algorithm during the execution of the learning algorithm; and
   said executing device continues the execution of the learning algorithm with the new step progress controlling method.

4. The system according to claim 1, further comprising:
   a display device visualizing and displaying a progress state of the execution of the learning algorithm by using an object, wherein:
   said change processing device makes a visual or numerical change to the object displayed by said displaying means on a display screen; and
   said executing device executes the learning algorithm, after contents of the change made to the object are reflected in a current learning algorithm, if the change is made to the object.

5. The system according to claim 1, wherein:
   said executing device is included in both a terminal device and a learning algorithm executing device; and
   the terminal device and the learning algorithm executing device are interconnected by a network.

6. The system according to claim 5, wherein:
   the learning algorithm executing device further comprises a transmitting unit for transmitting to the terminal device a progress state of the execution process of the learning algorithm, which is performed by said executing device; and
   the terminal device further comprises a transmitting unit for transmitting to the learning algorithm executing device the change of the execution process of the learning algorithm, which is set by said change processing device.

7. The system according to claim 1, wherein: the learning algorithm is an evoluntionary algorithm for obtaining an optimum solution or promising solutions to a given problem by evolving solution candidates.

8. A device for controlling execution of a learning algorithm for solving an optimization problem, wherein the device improves performance of the learning algorithm, comprising:
   a change processing unit setting a change of an execution process of the learning algorithm during the execution of the learning algorithm; and
   a transmitting unit transmitting to a learning algorithm executing device information about the change of the execution process of the learning algorithm, which is set by said change processing unit.

9. The device according to claim 8, further comprising:
   a displaying unit visualizing and displaying a progress state of the execution of the learning algorithm, which is received from the learning algorithm executing device.

10. A device for executing a learning algorithm for solving an optimization problem, wherein the device improves performance of the learning algorithm, comprising:
    a receiving unit receiving information about a change of an execution process of the learning algorithm if the change is made to the execution process during the execution of the learning algorithm; and
    an executing unit continuing the execution of the learning algorithm according to the information about the change of the execution process, which is received by said receiving unit.

11. The device according to claim 10, further comprising:
    an outputting unit outputting to a terminal a progress state of the execution process of the learning algorithm, which is performed by said executing unit.

12. A device for controlling execution of a learning algorithm for solving an optimization problem, wherein the device improves performance of the learning algorithm comprising:
    a processing unit setting at least either of an execution condition and a step progress controlling method of the learning algorithm; and
    a transmitting unit transmitting to a learning algorithm executing device at least either of the execution condition and the step progress controlling method, which is set by said processing unit.

13. The device according to claim 12, further comprising:
    a displaying unit visualizing and displaying a progress state of the execution of the learning algorithm, which is received from the learning algorithm executing device.

14. A device for executing a learning algorithm for solving an optimization problem, wherein the device improves performance of the learning algorithm, comprising:

a receiving unit receiving from a terminal device at least either information of an execution condition and a step progress controlling method of the learning algorithm; and an executing unit continuing the execution of the learning algorithm according to at least either information of the execution condition and the step progress controlling method of the learning algorithm, which is received by said receiving unit.

15. The device according to claim 14, further comprising:

an outputting unit outputting to the terminal the progress state of an execution process of the learning algorithm, which is performed by said executing unit.

16. A method for executing a learning algorithm for solving an optimization problem, wherein the method improves performance of the learning algorithm, comprising:

setting a change of an execution process of the learning algorithm during the execution of the learning algorithm; and continuing the execution of the learning algorithm according to the change of the execution process, if the change of the execution process is set during the execution of the learning algorithm.

17. The method according to claim 16, wherein:

a new execution condition of the learning algorithm is set during the execution of the learning algorithm in said setting; and the execution of the learning algorithm is continued under the new execution condition in said continuing.

18. The method according to claim 16, wherein:

a new step progress controlling method of the learning algorithm is set during the execution of the learning algorithm in said setting; and the execution of the learning algorithm is continued with the new step progress controlling method in said continuing.

19. The method according to claim 16, further comprising visualizing and displaying a progress state of the execution of the learning algorithm, wherein:

a visual or numerical change is made to a displayed object in said setting; and the learning algorithm is executed after contents of the change made to the object are reflected in a current learning algorithm in said continuing.

20. A method for controlling execution of a learning algorithm for solving an optimization problem, wherein the method improves performance of the learning algorithm, comprising:

setting a change of an execution process of the learning algorithm during the execution of the learning algorithm; and transmitting to a learning algorithm executing device information about the set change of the execution process of the learning algorithm.

21. The method according to claim 20, further comprising visualizing and displaying a progress state of the execution of the learning algorithm, which is received from the learning algorithm executing device.

22. A method for executing a learning algorithm for solving an optimization problem, wherein the method improves performance of the learning algorithm, comprising:

receiving information about a change of an execution process of the learning algorithm from a terminal device, if the change is made to the execution process during the execution of the learning algorithm; and continuing the execution of the learning algorithm according to the received information about the change of the execution process.

23. The method according to claim 22, further comprising outputting to the terminal device a progress state of the execution process of the learning algorithm.

24. A method for controlling execution of a learning algorithm for solving an optimization problem, wherein the method improves performance of the learning algorithm, comprising:

setting at least either of an execution condition and a step progress controlling method of the learning algorithm; and transmitting to a learning algorithm executing device at least either information of the execution condition information and the step progress controlling method of the learning algorithm, which is set in the setting, the transmitting performed while the learning algorithm is executing.

25. The method according to claim 24, further comprising visualizing and displaying a progress state of the execution of the learning algorithm, which is received from the learning algorithm executing device.

26. A method for executing a learning algorithm for solving an optimization problem, wherein the method improves performance of the learning algorithm, comprising:

receiving from a terminal device at least either information of an execution condition and a step progress controlling method of the learning algorithm; and continuing the execution of the learning algorithm according to at least either information of the execution condition and the step progress controlling method of the learning algorithm, which is received from the terminal device.

27. The method according to claim 26, further comprising outputting to the terminal device a progress state of an execution process of the learning algorithm.

28. A computer-readable medium storing a program implementing a method for executing a learning algorithm for solving an optimization problem by using a computer, wherein the method improves performance of the learning algorithm, the method comprising:

setting a change of an execution process of the learning algorithm during execution of the learning algorithm; and continuing the execution of the learning algorithm according to the change of the execution process, if the change of the execution process is set during the execution of the learning algorithm.

29. The medium according to claim 28, wherein:

a new execution condition of the learning algorithm is set during the execution of the learning algorithm in said setting; and the execution of the learning algorithm is continued under the new execution condition in said continuing.

30. The medium according to claim 28, wherein:

a new step progress controlling method of the learning algorithm is set during the execution of the learning algorithm in said setting; and the execution of the learning algorithm is continued with the new step progress controlling method in said continuing.

31. The medium according to claim 28, further comprising visualizing and displaying a progress state of the execution of the learning algorithm by using an object, wherein
a visual or numerical change is made to a displayed object in said setting,
the learning algorithm is executed after contents of the change made to the object are reflected in a current learning algorithm in said continuing.

32. A computer-readable medium storing a program implementing a method for executing a learning algorithm solving an optimization problem by using a computer, wherein the method improves performance of the learning algorithm, the method comprising:
setting a change of an execution process of the learning algorithm during execution of the learning algorithm; and
transmitting to a learning algorithm executing device information about the set change of the execution process of the learning algorithm.

33. The medium according to claim 32, further comprising a visualizing and displaying a progress state of the execution of the learning algorithm, which is received from the learning algorithm executing device.

34. A computer-readable medium storing a program for implementing a method for executing a learning algorithm for solving an optimization problem by using a computer, wherein the method improves performance of the learning algorithm, the method comprising:
receiving from a terminal device information about a change of an execution process, if the change is made to the execution process of the learning algorithm during the execution of the learning algorithm; and
continuing the execution of the learning algorithm according to the received information about the change of the execution process.

35. The medium according to claim 34, further comprising outputting to the terminal device a progress state of the execution process of the learning algorithm.

36. A computer-readable medium storing a program for implementing a method for executing a learning algorithm for solving an optimization problem by using a computer, wherein the method improves performance of the learning algorithm, the method comprising:
setting at least either of an execution condition and a step progress controlling method of the learning algorithm; and
transmitting to a learning algorithm executing device at least either information of the execution condition and the step progress controlling method of the learning algorithm, which is set, the transmitting performed while the learning algorithm is executing.

37. The medium according to claim 36, further comprising visualizing and displaying a progress state of the execution of the learning algorithm, which is received from the learning algorithm executing device in the setting.

38. A computer-readable medium storing a program for implementing a method for executing a learning algorithm for solving an optimization problem by using a computer, wherein the method improves performance of the learning algorithm, the method comprising:
receiving from a terminal device at least either information of an execution condition and a step progress controlling method of the learning algorithm; and
continuing the execution of the learning algorithm according to either information of the execution condition and the step progress controlling method of the learning algorithm, which is received from the terminal device.

39. The medium according to claim 38, further comprising outputting to the terminal device a progress state of an execution process of the learning algorithm.

* * * * *